(12) United States Patent
Grisamore et al.

(10) Patent No.: US 9,313,840 B2
(45) Date of Patent: Apr. 12, 2016

(54) CONTROL DATA DETERMINATION FROM PRIMARY-SIDE SENSING OF A SECONDARY-SIDE VOLTAGE IN A SWITCHING POWER CONVERTER

(75) Inventors: Robert T. Grisamore, Austin, TX (US); Zhaohui He, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 15 days.

(21) Appl. No.: 13/486,625

(22) Filed: Jun. 1, 2012

(65) Prior Publication Data
US 2012/0306406 A1     Dec. 6, 2012

Related U.S. Application Data

(60) Provisional application No. 61/492,871, filed on Jun. 3, 2011.

(51) Int. Cl.
*H05B 37/02*     (2006.01)
*H05B 33/08*     (2006.01)
*H02M 3/335*     (2006.01)

(52) U.S. Cl.
CPC ........ *H05B 33/0815* (2013.01); *H02M 3/33523* (2013.01); *Y02B 20/346* (2013.01); *Y02B 70/1433* (2013.01)

(58) Field of Classification Search
CPC ................................ H05B 37/02; H02M 7/44
USPC ............... 315/294; 363/95, 21.02, 21.03
See application file for complete search history.

(56) References Cited

U.S. PATENT DOCUMENTS 3,790,878 A    2/1974    Brokaw
4,677,366 A    6/1987    Wilkinson et al.
(Continued)

FOREIGN PATENT DOCUMENTS

EP    0536535 A1    4/1993
EP    0636889    1/1995
(Continued)

OTHER PUBLICATIONS

Brkovic, Milivoje, Automatic Current Shaper with Fast Output Regulation and Soft-Switching, Telecommunications Energy Conference, INTELEC '93. 15th International, Sep. 27-30, 1993, pp. 379-386, vol. 1, California Institute Technology, Pasadena, California USA.
(Continued)

*Primary Examiner* — Alexander H Taningco
*Assistant Examiner* — David Lotter
(74) *Attorney, Agent, or Firm* — Terrile, Cannatti, Chambers & Holland, LLP; Kent B. Chambers

(57) ABSTRACT

A power distribution system includes controller of a switching power converter to control the switching power converter and determine one or more switching power converter control parameters. In at least one embodiment, the controller determines the one or more switching power converter control parameters using a resonant period factor from a reflected secondary-side voltage and an occurrence of an approximate zero voltage crossing of the secondary-side voltage during a resonant period of the secondary-side voltage. In at least one embodiment, the switching power converter control parameters include (i) an estimated time of a minimum value of the secondary-side voltage during the resonant period and (ii) an estimated time at which a current in the secondary-side of the transformer decayed to approximately zero.

28 Claims, 8 Drawing Sheets

(56) References Cited

U.S. PATENT DOCUMENTS

| | | |
|---|---|---|
| 4,683,529 A | 7/1987 | Bucher |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Iwasa |
| 6,621,256 B2 | 9/2003 | Muratov et al. |
| 6,628,106 B1 | 9/2003 | Batarseh et al. |
| 6,657,417 B1 | 12/2003 | Hwang |
| 6,696,803 B2 | 2/2004 | Tao et al. |
| 6,724,174 B1 | 4/2004 | Esteves et al. |
| 6,734,639 B2 | 5/2004 | Chang et al. |
| 6,768,655 B1 | 7/2004 | Yang et al. |
| 6,781,351 B2 | 8/2004 | Mednik et al. |
| 6,839,247 B1 | 1/2005 | Yang |
| 6,862,198 B2 * | 3/2005 | Muegge et al. ............ 363/21.11 |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,099,163 B1 | 8/2006 | Ying |
| 7,102,902 B1 | 9/2006 | Brown et al. |
| 7,145,295 B1 | 12/2006 | Lee et al. |
| 7,161,816 B2 | 1/2007 | Shteynberg et al. |
| 7,221,130 B2 | 5/2007 | Ribeiro et al. |
| 7,233,135 B2 | 6/2007 | Noma et al. |
| 7,266,001 B1 | 9/2007 | Notohamiprodjo et al. |
| 7,276,861 B1 | 10/2007 | Shteynberg et al. |
| 7,292,013 B1 | 11/2007 | Chen et al. |
| 7,295,452 B1 | 11/2007 | Liu |
| 7,310,244 B2 | 12/2007 | Yang et al. |
| 7,342,812 B2 * | 3/2008 | Piper et al. ............ 363/21.16 |
| 7,388,764 B2 | 6/2008 | Huynh et al. |
| 7,411,379 B2 | 8/2008 | Chu |
| 7,505,287 B1 | 3/2009 | Kesterson |
| 7,554,473 B2 | 6/2009 | Melanson |
| 7,606,532 B2 | 10/2009 | Wuidart |
| 7,642,762 B2 | 1/2010 | Xie et al. |
| 7,647,125 B2 | 1/2010 | Melanson |
| 7,667,986 B2 | 2/2010 | Artusi et al. |
| 7,684,223 B2 | 3/2010 | Wei |
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,755,525 B2 | 7/2010 | Nanda et al. |
| 7,759,881 B1 | 7/2010 | Melanson |
| 7,786,711 B2 | 8/2010 | Wei et al. |
| 7,804,256 B2 | 9/2010 | Melanson |
| 7,804,480 B2 | 9/2010 | Jeon et al. |
| 7,821,237 B2 | 10/2010 | Melanson |
| 7,834,553 B2 | 11/2010 | Hunt et al. |
| 7,852,017 B1 | 12/2010 | Melanson |
| 7,863,828 B2 | 1/2011 | Melanson |
| 7,872,883 B1 | 1/2011 | Elbanhawy |
| 7,880,400 B2 | 2/2011 | Zhou et al. |
| 7,888,922 B2 | 2/2011 | Melanson |
| 7,894,216 B2 | 2/2011 | Melanson |
| 7,969,125 B2 | 6/2011 | Melanson |
| 8,008,898 B2 | 8/2011 | Melanson et al. |
| 8,008,902 B2 | 8/2011 | Melanson et al. |
| 8,018,171 B1 | 9/2011 | Melanson et al. |
| 8,040,703 B2 | 10/2011 | Melanson |
| 8,076,920 B1 | 12/2011 | Melanson |
| 8,115,465 B2 | 2/2012 | Park et al. |
| 8,120,341 B2 | 2/2012 | Melanson |
| 8,125,805 B1 | 2/2012 | Melanson |
| 8,169,806 B2 | 5/2012 | Sims et al. |
| 8,179,110 B2 | 5/2012 | Melanson |
| 8,188,677 B2 | 5/2012 | Melanson et al. |
| 8,193,717 B2 | 6/2012 | Leiderman |
| 8,222,772 B1 | 7/2012 | Vinciarelli |
| 8,222,832 B2 | 7/2012 | Zheng et al. |
| 8,232,736 B2 | 7/2012 | Melanson |
| 8,242,764 B2 | 8/2012 | Shimizu et al. |
| 8,248,145 B2 | 8/2012 | Melanson |
| 8,344,707 B2 | 1/2013 | Melanson et al. |
| 8,369,109 B2 | 2/2013 | Niedermeier et al. |
| 8,441,210 B2 | 5/2013 | Shteynberg et al. |
| 8,487,591 B1 | 7/2013 | Draper et al. |
| 8,536,799 B1 | 9/2013 | Grisamore et al. |
| 8,581,504 B2 | 11/2013 | Kost et al. |
| 8,593,075 B1 | 11/2013 | Melanson et al. |
| 8,610,364 B2 | 12/2013 | Melanson et al. |
| 8,654,483 B2 | 2/2014 | Etter |
| 8,803,439 B2 | 8/2014 | Stamm et al. |
| 8,816,593 B2 | 8/2014 | Lys et al. |
| 8,866,452 B1 | 10/2014 | Kost et al. |
| 8,912,781 B2 | 12/2014 | Singh et al. |
| 8,947,017 B2 | 2/2015 | Kikuchi et al. |
| 2003/0090252 A1 | 5/2003 | Hazucha |
| 2003/0111969 A1 | 6/2003 | Konoshi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov |
| 2004/0037094 A1 | 2/2004 | Muegge et al. |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022648 A1 | 2/2006 | Zeltser |
| 2006/0022916 A1 | 2/2006 | Aiello |
| 2006/0214603 A1 | 9/2006 | Oh et al. |

(56) References Cited

U.S. PATENT DOCUMENTS

| | | |
|---|---|---|
| 2006/0261754 A1 | 11/2006 | Lee |
| 2006/0285365 A1 | 12/2006 | Huynh |
| 2007/0024213 A1 | 2/2007 | Shteynberg |
| 2007/0103949 A1 | 5/2007 | Tsuruya |
| 2007/0170873 A1 | 7/2007 | Mishima |
| 2007/0182338 A1 | 8/2007 | Shteynberg |
| 2007/0285031 A1 | 12/2007 | Shteynberg |
| 2008/0018261 A1 | 1/2008 | Kastner |
| 2008/0043504 A1 | 2/2008 | Ye |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0174291 A1 | 7/2008 | Hansson |
| 2008/0175029 A1 | 7/2008 | Jung et al. |
| 2008/0224636 A1 | 9/2008 | Melanson |
| 2008/0259655 A1 | 10/2008 | Wei |
| 2008/0278132 A1 | 11/2008 | Kesterson et al. |
| 2008/0310194 A1 | 12/2008 | Huang et al. |
| 2009/0059632 A1 | 3/2009 | Li et al. |
| 2009/0067204 A1 | 3/2009 | Ye et al. |
| 2009/0079357 A1 | 3/2009 | Shteynberg et al. |
| 2009/0108677 A1 | 4/2009 | Walter et al. |
| 2009/0184665 A1 | 7/2009 | Ferro |
| 2009/0243582 A1 | 10/2009 | Irissou et al. |
| 2009/0284182 A1 | 11/2009 | Cencur |
| 2009/0295300 A1 | 12/2009 | King |
| 2010/0060200 A1 | 3/2010 | Newman et al. |
| 2010/0066328 A1 | 3/2010 | Shimizu et al. |
| 2010/0128501 A1 | 5/2010 | Huang et al. |
| 2010/0141317 A1 | 6/2010 | Szajnowski |
| 2010/0148681 A1 | 6/2010 | Kuo et al. |
| 2010/0156319 A1 | 6/2010 | Melanson |
| 2010/0213859 A1* | 8/2010 | Shteynberg et al. .......... 315/224 |
| 2010/0218367 A1 | 9/2010 | Feng et al. |
| 2010/0238689 A1* | 9/2010 | Fei et al. .................... 363/21.16 |
| 2010/0244726 A1 | 9/2010 | Melanson |
| 2010/0244793 A1 | 9/2010 | Caldwell |
| 2011/0110132 A1 | 5/2011 | Rausch |
| 2011/0199793 A1 | 8/2011 | Kuang et al. |
| 2011/0276938 A1 | 11/2011 | Perry et al. |
| 2011/0291583 A1 | 12/2011 | Shen |
| 2011/0309760 A1 | 12/2011 | Beland et al. |
| 2012/0025736 A1 | 2/2012 | Singh et al. |
| 2012/0056551 A1 | 3/2012 | Zhu et al. |
| 2012/0146540 A1 | 6/2012 | Khayat et al. |
| 2012/0153858 A1 | 6/2012 | Melanson et al. |
| 2012/0176819 A1 | 7/2012 | Gao et al. |
| 2012/0187997 A1 | 7/2012 | Liao et al. |
| 2012/0248998 A1 | 10/2012 | Yoshinaga |
| 2012/0320640 A1 | 12/2012 | Baurle et al. |
| 2013/0181635 A1 | 7/2013 | Ling |
| 2014/0218978 A1 | 8/2014 | Heuken et al. |

FOREIGN PATENT DOCUMENTS

| | | |
|---|---|---|
| EP | 0636889 A1 | 1/1995 |
| EP | 1213823 A2 | 6/2002 |
| EP | 1289107 A3 | 8/2002 |
| EP | 1289107 A3 | 5/2003 |
| EP | 1962263 A1 | 8/2008 |
| EP | 2232949 | 9/2010 |
| EP | 2257124 A1 | 12/2010 |
| JP | 2006022107 A1 | 3/2006 |
| JP | 2008053181 A | 3/2006 |
| WO | 01/84697 A2 | 11/2001 |
| WO | 2004/051834 A1 | 6/2004 |
| WO | 2006013557 | 2/2006 |
| WO | 2006022107 | 3/2006 |
| WO | 2007016373 A3 | 2/2007 |
| WO | 2008/004008 A2 | 1/2008 |
| WO | 2008152838 | 12/2008 |
| WO | 2010011971 A1 | 1/2010 |
| WO | 2010065598 A2 | 6/2010 |
| WO | 2010065598 | 10/2010 |
| WO | 2011008635 A1 | 1/2011 |

OTHER PUBLICATIONS

Dilouie, Craig, Introducing the LED Driver, Electrical Construction & Maintenance (EC&M), Sep. 1, 2004, ,pp. 28-32, Zing Communications, Inc., Calgary, Alberda, Canada.

Spiazzi, Giorgio, Simone Buso and Gaudenzio Meneghesso, Analysis of a High-Power-Factor Electronic Ballast for High Brightness Light Emitting Diode, Power Electronics Specialist Conference, 2005. PESC '05, IEEE 36th, pp. 1494-1499, 2005, Dept. of Information Engineering, University of Padova, Padova, Italy.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Renesas, Renesas Technology Releases Industry's First Critical-Conduction-Mode Power Factor Correction Control IC Implementing Interleaved Operations, R2A20112, Dec. 18, 2006, Tokyo, Japan.

Renesas, PFC Control IC R2A20111 Evaluation Board, Application Note R2A20111 EVB, Feb. 2007, Rev. 1.0, Tokyo, Japan.

Renesas, Power Factor Correction Controller IC, HA16174P/FP, Rev. 1.0, Jan. 6, 2006, Tokyo, Japan.

Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.

STMicroelectronics, Transition-Mode PFC Controller, Datasheet L6562, Rev. 8, Nov. 2005, Geneva, Switzerland.

STMicroelectronics, Electronic Ballast with PFC Using L6574 and L6561, Application Note AN993, May 2004, Geneva Switzerland.

STMicroelectronics, Advanced Transition-Mode PFC Controller L6563 and L6563A, Mar. 2007, Geneva Switzerland.

STMicroelectronics, CFL/TL Ballast Driver Preheat and Dimming, L6574, Sep. 2003, Geneva Switzerland.

STMicroelectronics, Power Factor Corrector, L6561, Rev. 16, Jun. 2004, Geneva, Switzerland.

Texas Instruments, Avoiding Audible Noise at Light Loads When Using Leading Edge Triggered PFC Converters, Application Report SLUA309A, Mar. 2004—Revised Sep. 2004, Dallas, TX, USA.

Texas Instruments, Startup Current Transient of the Leading Edge Triggered PFC Controllers, Application Report SLUA321, Jul. 2004, Dallas, TX, USA.

Texas Instruments, Current Sense Transformer Evaluation UCC3817, Application Report SLUA308, Feb. 2004, Dallas, TX, USA.

Texas Instruments, 350-W, Two-Phase Interleaved PFC Pre-regulator Design Review, Application Report SLUA369B, Feb. 2005—Revised Mar. 2007, Dallas, TX, USA.

Texas Instruments, Average Current Mode Controlled Power Factor Correction Converter using TMS320LF2407A, Application Report SPRA902A, Jul. 2005, Dallas, TX, USA.

Texas Instruments, Transition Mode PFC Controller, UCC28050, UCC28051, UCC38050, UCC38051, Application Note SLUS5150, Sep. 2002—Revised Jul. 2005, Dallas TX, USA.

Texas Instruments, Interleaving Continuous Conduction Mode PFC Controller, UCC28070, SLUS794C, Nov. 2007—Revised Jun. 2009, Dallas, TX, USA.

Texas Instruments, BiCMOS Power Factor Prerefulator Evaluation Board UCC3817, User's Guide, SLUU077C, Sep. 2000—Revised Nov. 2002, Dallas, TX, USA.

On Semiconductor, Four Key Steps to Design a Continuous Conduction Mode PFC Stage Using the NCP1653, Application Note AND8184/D, Nov. 2004, Phoenix, AZ, USA.

Unitrode, BiCMOS Power Factor Preregulator, Texas Instruments, UCC2817, UCC2818, UCC3817, UCC3818, SLUS3951, Feb. 2000—Revised Feb. 2006, Dallas, TX, USA.

Unitrode, Optimizing Performance in UC 3854 Power Factor Correction Applications, Design Note DDN-39E, 1999, Merrimack, ME, USA.

Unitrode, High Power-Factor Preregulator, UC1852, UC2852, UC3852, Feb. 5, 2007, Merrimack, ME, USA.

(56) References Cited

OTHER PUBLICATIONS

Unitrode, UC3854A/B and UC3855A/B Provide Power Limiting with Sinusoidal Input Current for PFC Front Ends, SLUA196A, Design Note DN-66, Jun. 1995—Revised Nov. 2001, Merrimack, ME, USA.
Unitrode, Programmable Output Power Factor Preregulator, UCC2819, UCC3819, SLUS482B, Apr. 2001—Revised Dec. 2004, Merrimack, ME, USA.
Yao, et al, Soft Switching Circuit for Interleaved Boost Converters, IEEE Transactions on Power Electronics, vol. 22, No. 1, Jan. 2007, pp. 80-86, Zhejiang Univ., Hangzhou.
Zhang, et al, A New Duty Cycle Control Strategy for Power Factor Correction and FPGA Implementation, IEEE Transactions on Power Electronics, vol. 21, No. 6, Nov. 2006, pp. 1745-1753, Ontario, Canada.
Zhou, et al, Novel Sampling Algorithm for DSP Controlled 2kW PFC Converter, IEEE Transactions on Power Electronics, vol. 16, No. 2, Mar. 2001, pp. 217-222, Zhejiang Univ., Hangzhou.
Texas Instruments, UCC281019, 8-Pin Continuous Conduction Mode (CCM) PFC Controller, SLU828B, Revised Apr. 2009, all pages, Dallas, Texas, USA.
http://toolbarpdf.com/docs/functions-and-features-of-inverters.html printed on Jan. 20, 2011.
International Search Report and Written Opinion issued in the corresponding PCT Application No. PCT/US2012/040522 and mailed on Sep. 10, 2012.
International Preliminary Report on Patentability, PCT/US2012/040522, The International Bureau of WIPO, Dec. 4, 2013, p. 1.
Written Opinion, PCT/US2012/040522, European Patent Office, Dec. 4, 2013, pp. 1-7.
Texas Instruments, High Performance Power Factor Preregulator, UC2855A/B and UC3855A/B, SLUS328B, Jun. 1998, Revised Oct. 2005, pp. 1-14, Dallas, TX, USA.
Balogh, Laszlo, et al,Power-Factor Correction with Interleaved Boost Converters in Continuous-Inductr-Current Mode, 1993, IEEE, pp. 168-174, Switzerland.
Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.
Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.
Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.
Infineon Technologies AG, Standalone Power Factor Correction (PFC) Controller in Continuous Conduction Mode (CCM), Infineon Power Management and Supply, CCM-PFC, ICE2PCS01, ICE2PCSO1G, Version 2.1, Feb. 6, 2007, p. 1-22, Munchen, Germany.
Lu, et al, Bridgeless PFC Implementation Using One Cycle Control Technique, International Rectifier, 2005, pp. 1-6, Blacksburg, VA, USA.
Brown, et al, PFC Converter Design with IR1150 One Cycle Control IC, International Rectifier, Application Note AN-1077, pp. 1-18, El Segundo CA, USA.
International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.
International Rectifier, IRAC1150-300W Demo Board, User's Guide, Rev 3.0, International Rectifier Computing and Communications SBU-AC-DC Application Group, pp. 1-18, Aug. 2, 2005, El Segundo, CO USA.
Lai, Z., et al, A Family of Power-Factor-Correction Controllerr, Applied Power Electronics Conference and Exposition, 1997. APEC '97 Conference Proceedings 1997., Twelfth Annual, vol. 1, pp. 66-73, Feb. 23-27, 1997, Irvine, CA.
Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Horn, Kowloon, Hong Kong.
Linear Technology, Single Switch PWM Controller with Auxiliary Boost Converter, Linear Technology Corporation, Data Sheet LT1950, pp. 1-20, Milpitas, CA, USA.
Linear Technology, Power Factor Controller, Linear Technology Corporation, Data Sheet LT1248, pp. 1-12, Milpitas, CA, USA.
Supertex, Inc., HV9931 Unity Power Factor LED Lamp Driver, Supertex, Inc., Application Note AN-H52, 2007, pp. 1-20, Sunnyvale, CA, USA.
Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.
Erickson, Robert W., et al, Fundamentals of Power Electronics, Second Edition, Chapter 6, 2001, pp. 131-184, Boulder CO, USA.
Fairchild Semiconductor, Theory and Application of the ML4821 Average Current Mode PFC Controller, Fairchild Semiconductor, Application Note 42030, Rev. 1.0, Oct. 25, 2000, pp. 1-19, San Jose, CA, USA.
Fairchild Semiconductor, 500W Power-Factor-Corrected (PFC) Converter Design with FAN4810, Application Note 6004, Rev. 1.0.1, Oct. 31, 2003, San Jose, CA, USA.
Fairfield Semiconductor, Power Factor Correction (PFC) Basics, Application Note 42047, Rev. 0.9.0, Aug. 19, 2004, San Jose, CA, USA.
Fairchild Semiconductor, Design of Power Factor Correction Circuit Using FAN7527B, Application Note AN4121, Rev. 1.0.1, May 30, 2002, San Jose, CA, USA.
Fairchild Semiconductor, Low Start-Up Current PFC/PWM Controller Combos FAN4800, Rev. 1.0.6, Nov. 2006, San Jose, CA, USA.
Fairchild Semiconductor, Power Factor Correction Controller FAN4810, Rev. 1.0.12, Sep. 24, 2003, San Jose, CA, USA.
Fairchild Semiconductor, ZVS Average Current PFC Controller Fan 4822, Rev. 1.0.1, Aug. 10, 2001, San Jose, CA, USA.
Fairchild Semiconductor, Ballast Control IC FAN7532, Rev. 1.0.2, Jun. 2006, San Jose, CA, USA.
Fairchild Semiconductor, Simple Ballast Controller FAN7544, Rev. 1.0.0, Sep. 21, 2004, San Jose, CA, USA.
Fairchild Semiconductor, Power Factor Correction Controller FAN7527B, Aug. 16, 2003, San Jose, CA, USA.
Fairchild Semiconductor, Ballast Control IC FAN7711, Rev. 1.0.2, 2007, San Jose, CA, USA.
Fairchild Semicondctor, Simple Ballast Controller, KA7541, Rev. 1.0.3, Sep. 27, 2001, San Jose, CA, USA.
Fairchild Semiconductor, Power Factor Controller, ML4812, Rev. 1.0.4, May 31, 2001, San Jose, CA, USA.
Fairchild Semiconductor, Power Factor Controller, ML4821, Rev. 1.0.2, Jun. 19, 2001, San Jose, CA, USA.
Freescale Semiconductor, Dimmable Light Ballast with Power Factor Correction, Designer Reference Manual, DRM067, Rev. 1, Dec. 2005, M681-1C08 Microcontrollers, Chandler, AZ, USA.
Freescale Semiconductor, Design of Indirect Power Factor Correction Using 56F800/E, Freescale Semiconductor Application Note, AN1965, Rev. 1, Jul. 2005, Chandler, AZ, USA.
Freescale Semiconductor, Implementing PFC Average Current Mode Control using the MC9S12E128, Application Note AN3052, Addendum to Reference Design Manual DRM064, Rev. 0, Nov. 2005, Chandler, AZ, USA.
Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.
Madigan, et al, Integrated High-Quality Rectifier-Regulators, Industrial Electronics, IEEE Transactions, vol. 46, Issue 4, pp. 749-758, Aug. 1999, Cary, NC, USA.

(56) References Cited

OTHER PUBLICATIONS

Maksimovic, et al, Impact of Digital Control in Power Electronics, International Symposium on Power Semiconductor Devices and ICS, 2004, Boulder, CO, USA.

Mammano, Bob, Current Sensing Solutions for Power Supply Designers, Texas Instruments, 2001, Dallas TX.

Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.

Noon, Jim, High Performance Power Factor Preregulator UC3855A/B, Texas Instruments Application Report, SLUA146A, May 1996—Revised Apr. 2004, Dallas TX, USA.

NXP Semiconductors, TEA1750, GreenChip III SMPS Control IC Product Data Sheet, Rev.01, Apr. 6, 2007, Eindhoven, The Netherlands.

Turchi, Joel, Power Factor Correction Stages Operating in Critical Conduction Mode, ON Semiconductor, Application Note AND8123/D, Sep. 2003-Rev. 1, Denver, CO, USA.

On Semiconductor, GreenLLine Compact Power Factor Controller: Innovative Circuit for Cost Effective Solutions, MC33260, Semiconductor Components Industries, Sep. 2005—Rev. 9, Denver, CO, USA.

On Semiconductor, Enhanced, High Voltage and Efficient Standby Mode, Power Factor Controller, NCP1605, Feb. 2007, Rev. 1, Denver, CO, USA.

On Semiconductor, Cost Effective Power Factor Controller, NCP1606, Mar. 2007, Rev. 3, Denver, CO, USA.

On Semiconductor, Power Factor Controller for Compact and Robust, Continuous Conduction Mode Pre-Converters, NCP1654, Mar. 2007, Rev. PO, Denver, CO, USA.

Philips Semiconductors, 90W Resonant SMPS with TEA1610 SwingChip, Application Note AN99011, Sep. 14, 1999, The Netherlands.

Prodic, et al, Dead-Zone Digital Controller for Improved Dynamic Response of Power Factor Preregulators, Applied Power Electronics Conference and Exposition, 2003. APEC '03. Eighteenth Annual IEEE, Feb. 9-13, 2003, vol. 1, pp. 382-388, Boulder, CO, USA.

Prodic, et al, Digital Controller for High-Frequency Rectifiers with Power Factor Correction Suitable for On-Chip Implementation, Power Conversion Conference-Nagoya, 2007. PCC '07, Apr. 2-5, 2007, pp. 1527-1531, Toronto, Canada.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Su, et al, Ultra Fast Fixed-Frequency Hysteretic Buck Converter with Maximum Charging Current Control and Adaptive Delay Compensation for DVS Applications, IEEE Journal of Solid-State Circuits, vol. 43, No. 4, Apr. 2008, pp. 815-822, Hong Kong University of Science and Technology, Hong Kong, China.

Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.

Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.

First Office Action dated Jun. 12, 2015, mailed in Application No. 201280027057X, The State Intellectual Property Office of the People's Republic of China, pp. 1-6.

Search Report dated Jun. 4, 2015, mailed in Application No. 201280027057X, The State Intellectual Property Office of the People's Republic of China, pp. 1-2.

Response to the Written Opinion as filed Jul. 24, 2014, Application No. 12731216.3, European Patent Office, pp. 1-19.

Second Office Action dated Nov. 17, 2015, mailed in Application No. 201280027057X, The State Intellectual Property Office of the People's Republic of China, pp. 1-3.

* cited by examiner

US 9,313,840 B2

CONTROL DATA DETERMINATION FROM PRIMARY-SIDE SENSING OF A SECONDARY-SIDE VOLTAGE IN A SWITCHING POWER CONVERTER

CROSS-REFERENCE TO RELATED APPLICATION

This application claims the benefit under 35 U.S.C. §119 (e) and 37 C.F.R. §1.78 of U.S. Provisional Application No. 61/492,871, filed Jun. 3, 2011, and entitled "Resonant Period Extractor for Switching Mode Power Supply"," which is incorporated by reference in its entirety.

BACKGROUND OF THE INVENTION

1. Field of the Invention

The present invention relates in general to the field of electronics, and more specifically to a method and system for determining control data from primary-side sensing of a secondary-side voltage in a switching power converter.

2. Description of the Related Art

Many electronic systems utilize switching power converters to efficient convert power from one source into power useable by a device (referred to herein as a "load"). For example, power companies often provide alternating current (AC) power at specific voltages within a specific frequency range. However, many loads utilize power at a different voltage and/or frequency than the supplied power. For example, some loads, such as light emitting diode (LED) based lamps operate from a direct current (DC). "DC current" is also referred to as "constant current". "Constant" current does not mean that the current cannot change over time. The DC value of the constant current can change to another DC value. Additionally, a constant current may have noise or other minor fluctuations that cause the DC value of the current to fluctuate. "Constant current devices" have a steady state output that depends upon the DC value of the current supplied to the devices.

LEDs are becoming particularly attractive as main stream light sources in part because of energy savings through high efficiency light output, long life, and environmental incentives such as the reduction of mercury. LEDs are semiconductor devices and are best driven by direct current. The brightness of the LED varies in direct proportion to the DC current supplied to the LED. Thus, increasing current supplied to an LED increases the brightness of the LED and decreasing current supplied to the LED dims the LED.

FIG. 1 depicts power distribution system 100 that converts power from voltage source 102 into power usable by load 104. Load 104 is a constant current load that includes, for example, one or more LEDs. A controller 106 controls the power conversion process. Voltage source 102 supplies an alternating current (AC) input voltage $V_{IN}$ to a full bridge diode rectifier 108. The voltage source 102 is, for example, a public utility, and the AC voltage $V_{IN}$ is, for example, a 60 Hz/110 V line voltage in the United States of America or a 50 Hz/220 V line voltage in Europe. The rectifier 108 supplies a rectified AC voltage $V_X$ to the switching power converter 110. The switching power converter 110 serves as a power supply that converts the AC voltage $V_X$ into a DC link voltage $V_{LINK}$.

The controller 106 provides a control signal $CS_0$ to switching power converter 110 to control the conversion of rectified input voltage $V_X$ into a link voltage $V_{LINK}$. The switching power converter 110 can be any type of switching power converter, such as a boost, buck, boost-buck, or Cúk type switching power converter. The link voltage $V_{LINK}$ is generally a DC voltage that is maintained at an approximately constant level by switching power converter 110. Controller 106 also generates control signal $CS_1$ to control load drive switch 112. When control signal $CS_1$ causes switch 112 to conduct, a primary-side current $i_{PRIMARY}$ flows into a primary coil 114 of transformer 116 to magnetize the primary coil 114. When control signal $CS_1$ opens switch 112, primary coil 114 demagnetizes. The magnetization and demagnetization of the primary coil 114 induces a secondary voltage $V_S$ across a secondary coil 118 of transformer 116. Primary voltage $V_P$ is N times the secondary voltage $V_S$, i.e. $V_P = N \cdot V_S$, and "N" is a ratio of coil turns in the primary coil 114 to the coil turns in the secondary coil 118. The secondary-side current $i_{SECONDARY}$ is a direct function of the secondary voltage $V_S$ and the impedance of diode 120, capacitor 122, and load 104. Diode 120 allows the secondary-side current $i_{SECONDARY}$ to flow in one direction. The secondary-side current $i_{SECONDARY}$ charges capacitor 122, and capacitor 122 maintains an approximately DC voltage $V_{LOAD}$ across load 104. Thus, secondary-side current $i_{SECONDARY}$ is a DC current.

Since the control signal $CS_1$ generated by the controller 106 controls the primary-side current $i_{PRIMARY}$, and the primary-side current $i_{PRIMARY}$ controls the voltage $V_P$ across the primary coil 114, the energy transfer from the primary coil 114 to the secondary coil 118 is controlled by the controller 106. Thus, the controller 106 controls the secondary-side current $i_{SECONDARY}$.

The controller 106 operates the switching power converter 110 in a certain mode, such as quasi-resonant mode. In quasi-resonant mode, the control signal $CS_1$ turns switch 112 ON at a point in time that attempts to minimize the voltage across switch 112, and, thus, minimize current through switch 112. Controller 106 generates the control signal $CS_1$ in accordance with a sensed primary-side current $i_{PRIMARY\_SENSE}$, obtained via link current sense path 126.

To deliver a known amount of power to the load 104, the controller 106 can determine the amount of power delivered to the load 104 by knowing the values of the secondary-side voltage $V_S$ and the secondary-side current $i_{SECONDARY}$. The controller 106 can derive the secondary-side voltage $V_S$ from the primary-side voltage $V_P$ in accordance with $V_P = N \cdot V_S$, as previously discussed. The controller 106 determines the value of the secondary-side current $i_{SECONDARY}$ by monitoring the value of $i_{SECONDARY\_SENSE}$, which is a scaled version of the secondary-side current $i_{SECONDARY}$ with a scaling factor of M. "M" is a number representing fractional ratio of the secondary-side current $i_{SECONDARY}$ to the secondary-side sense current $i_{SECONDARY\_SENSE}$. Thus, the power $P_{LOAD}$ delivered to the load 104 is $P_{LOAD} = V_P/N \cdot M \cdot i_{SECONDARY\_SENSE}$.

However, directly sensing the secondary-side current $i_{SECONDARY}$ generally requires an opto-coupler or some other relatively expensive component to provide connectivity to the secondary-side of transformer 116.

SUMMARY OF THE INVENTION

In one embodiment of the present invention, a method includes receiving a sense signal from a primary-side of a transformer of a switching power converter. The sense signal represents a secondary-side voltage across a secondary-side of the transformer. The method further includes determining one or more times between approximately zero crossings of the secondary-side voltage during one or more resonant periods of the secondary-side voltage. Each resonant period occurs after the secondary-side voltage decreases to zero and before a current in the primary-side of the transformer increases from approximately zero. The method also includes determining one or more resonant period factors from the one or more times between approximately zero crossings of the secondary-side voltage. The method also includes determining one or more switching power converter control parameters using (i) the one or more resonant period factors and (ii) an occurrence of an approximate zero voltage crossing of the secondary-side voltage during a resonant period of the secondary-side voltage.

In another embodiment of the present invention, an apparatus includes a controller. The controller includes an input to receive a sense signal from a primary-side of a transformer of a switching power converter. The sense signal represents a secondary-side voltage across a secondary-side of the transformer, and the controller is capable to determine one or more times between approximately zero crossings of the secondary-side voltage during one or more resonant periods of the secondary-side voltage. Each resonant period occurs after the secondary-side voltage decreases to zero and before a current in the primary-side of the transformer increases from approximately zero. The controller is further capable to determine one or more resonant period factors from the one or more times between approximately zero crossings of the secondary-side voltage. The controller is further capable to determine one or more switching power converter control parameters using (i) the one or more resonant period factors and (ii) an occurrence of an approximate zero voltage crossing of the secondary-side voltage during a resonant period of the secondary-side voltage.

In a further embodiment of the present invention, an apparatus includes a switching power converter. The switching power converter includes a transformer having a primary-side and a secondary-side. The apparatus further includes a controller The controller includes an input to receive a sense signal from a primary-side of a transformer of a switching power converter. The sense signal represents a secondary-side voltage across a secondary-side of the transformer, and the controller is capable to determine one or more times between approximately zero crossings of the secondary-side voltage during one or more resonant periods of the secondary-side voltage. Each resonant period occurs after the secondary-side voltage decreases to zero and before a current in the primary-side of the transformer increases from approximately zero. The controller is further capable to determine one or more resonant period factors from the one or more times between approximately zero crossings of the secondary-side voltage. The controller is further capable to determine one or more switching power converter control parameters using (i) the one or more resonant period factors and (ii) an occurrence of an approximate zero voltage crossing of the secondary-side voltage during a resonant period of the secondary-side voltage. The apparatus also includes a load coupled to the secondary-side of the transformer of the switching power converter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
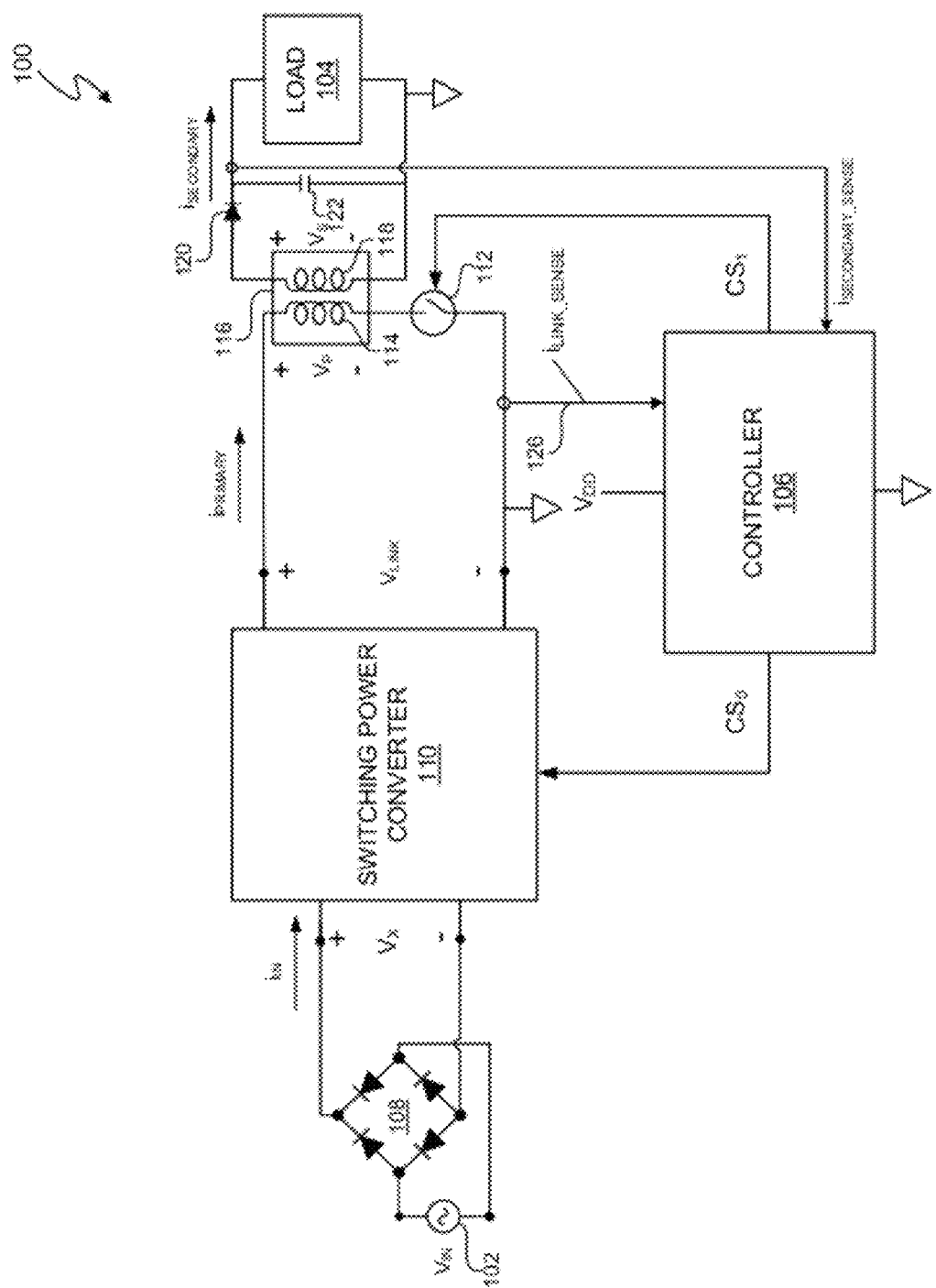
FIG. 1 (labeled prior art) depicts a power distribution system.

A power distribution system includes controller of a switching power converter to control the switching power converter and determine one or more switching power converter control parameters. In at least one embodiment, the switching power converter utilizes a transformer to transfer energy from a primary-side of the transformer to a secondary-side. An input voltage source is connected to the primary-side, and a load is connected to the secondary-side. The controller utilizes the switching power converter control parameters to control a current control switch on the primary-side of the switching power converter, which controls the energy transfer process.

In at least one embodiment, the controller determines the one or more switching power converter control parameters using a resonant period factor from a reflected secondary-side voltage and an occurrence of an approximate zero voltage crossing of the secondary-side voltage during a resonant period of the secondary-side voltage. In at least one embodiment, the switching power converter control parameters include (i) an estimated time of a minimum value of the secondary-side voltage during the resonant period and (ii) an estimated time at which a current in the secondary-side of the transformer decayed to approximately zero. In at least one embodiment, causing the current control switch to conduct and allow current to flow through the primary-side of the transformer at an estimated time of a minimum value of the secondary-side voltage during the resonant period reduces energy losses and is, thus, more energy efficient. In at least one embodiment, determining an estimated time at which a current in the secondary-side of the transformer decayed to approximately zero allows the controller to determine the amount of energy transferred to a load and, thus, control the switching power converter to meet the power demand of a load. The term "approximately" as used herein means exact or sufficiently close to exact to allow a component, system, or process to achieve its intended function.

The secondary-side voltage enters a decaying resonant period after the current decayed to zero in the secondary-side winding. As previously mentioned, causing the current control switch to conduct at an estimated time of a minimum value of the secondary-side voltage is efficient; however, determining when the minimum value will occur presents a challenge. In at least one embodiment, the resonant period of the secondary-side voltage is relatively stable from cycle-to-cycle of the primary-side switch. By indirectly sensing the secondary-side voltage, such as sensing a reflected secondary-side voltage in an auxiliary winding, the controller can sense zero crossings of the secondary-side voltage. By sensing the time between at least two of the zero crossings, the controller can determine a resonant period factor. Since the time between a zero crossing and a minimum value of the secondary-side resonant voltage equals the resonant period divided by 4 (referred to at "$T_{RES}/4$"), in at least one embodiment, the controller can determine the timing of the minimum value by adding the resonant period factor $T_{RES}/4$ to the time of the detected zero crossing.

In at least one embodiment, the controller generally operates the switching power converter in discontinuous conduction mode, critical conduction mode, or quasi-resonant mode. However, in at least one embodiment, the controller probes a reflected, secondary-side voltage to determine the resonant period by extending a duration of the current control switch cycle to include one or more consecutive resonant periods. In at least one embodiment, probing the resonant period occurs during multiple consecutive and/or non-consecutive switch cycles to determine the duration of multiple resonant periods. In at least one embodiment, the controller includes a digital filter to process the multiple resonant periods to obtain a single estimation of the resonant period. For example, in at least one embodiment, the digital filter averages the multiple resonant periods to obtain an average resonant period. Additionally, in at least one embodiment, the current control switch is a field effect transistor (FET). In at least one embodiment, the controller probes the reflected, secondary-side voltage when an input voltage to the primary-side of the transformer is sufficient to reverse bias a body diode of the current control switch to more accurately determine the resonant period factor.

Additionally, the secondary-side current leads the secondary-side voltage in phase by ninety degrees (90°). Thus, in at least one embodiment, the controller can determine when the secondary-side current decayed to approximately zero by subtracting the resonant period factor $T_{RES}/4$ from an initial occurrence during a switch conduction cycle of a zero crossing of the secondary-side voltage. Additionally, in at least one embodiment, the determination of the switching power converter control parameters occurs using data sensed from a reflected secondary-side voltage without a physical connection to the secondary-side.

Figure 2:
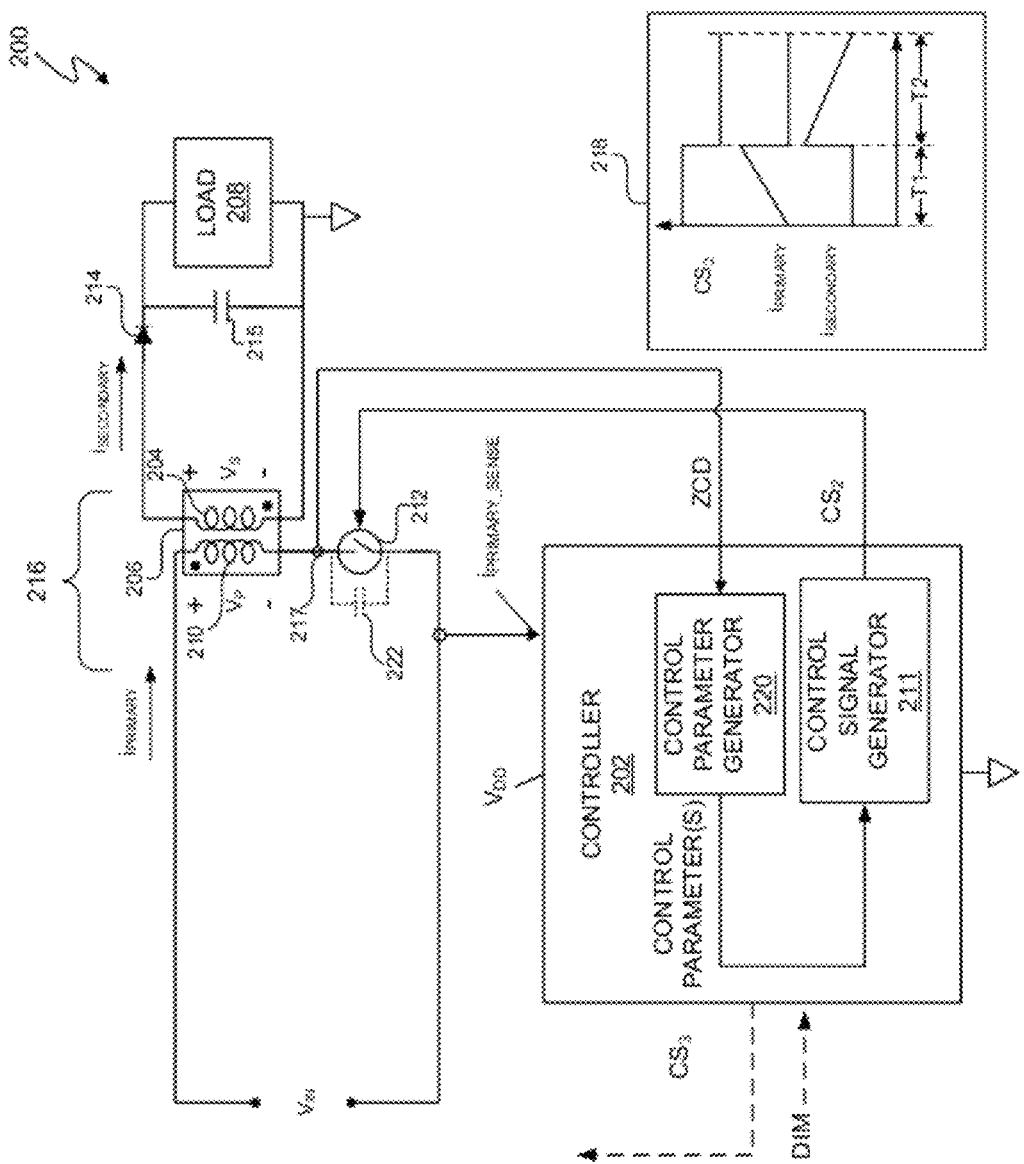
FIG. 2 depicts a power distribution system that utilizes reflected secondary-side voltage zero crossing and resonant period factors to determine control parameters.

FIG. 2 depicts a power distribution system 200 that includes a controller 202 that determines one or more switching power converter control parameters using (i) a resonant period factor and (ii) an occurrence of an approximate zero voltage crossing of the secondary-side voltage during a resonant period of the secondary-side voltage. The particular switching power converter control parameters are a matter of design choice and are, in at least one embodiment, at least one of (i) an estimated time of a minimum value of the secondary-side voltage during the resonant period and (ii) an estimated time at which a current in the secondary-side of the transformer decayed to approximately zero. The resonant period factor represents a value associated with the resonant period of the secondary-side voltage $V_S$ across the secondary-side coil 204 of a transformer, such as transformer 206. Power distribution system 200 receives an input voltage $V_{IN}$. The input voltage $V_{IN}$ may be a DC voltage, for example, provided by a battery or the link voltage $V_{LINK}$ in FIG. 1, or an AC voltage, such as the AC input voltage 102. The term "approximately" is used because a DC voltage from a switching power converter can vary by, for example, 5-10% of a nominal value and can contain ripple and noise.

The controller 202 regulates the power delivered to load 208 by regulating the primary-side current $i_{PRIMARY}$ conducted by the primary-side coil 210. Load 208 can be any type of load, such as one or more light emitting diodes (LEDs). In at least one embodiment, the controller 202, the switching power converter 216, and the load 208 are included as part of a lamp (not shown). The controller 202 includes a control signal generator 211 to generate a control signal $CS_2$ to control the switching power converter 216. The control signal generator 211 regulates the primary-side current $i_{PRIMARY}$ by regulating the duty cycle of control signal $CS_2$, which regulates the duty cycle of exemplary current control switch 212. The current control switch 212 can be any type of switch and, in at least one embodiment, is a field effect transistor (FET). The primary-side current $i_{PRIMARY}$ energizes the primary-side coil 210 when the control signal $CS_2$ causes the switch 212 to conduct during period T1 as shown in the exemplary waveforms 218. As indicated by the dot configuration of the transformer 206, when the primary-side current $i_{PRIMARY}$ flows from the primary side coil 210 towards the switch 212, the induced secondary-side voltage $V_S$ reverse biases diode 214. When diode 214 is reversed biased, the secondary-side current $i_{SECONDARY}$ is zero, and the capacitor 215 supplies energy to the load 208. When switch 212 stops conducting at the end of the period T1, period T2 begins, and the polarity of the primary-side voltage $V_P$ and the secondary-side voltage reverses, which is often referred to as the flyback period. The reversal of the secondary-side voltage $V_S$ forward biases diode 214. When the diode 214 is forward biased, the secondary-side current $i_{SECONDARY}$ rises virtually instantaneously and then ramps down to zero when the switching power converter 216 operates in discontinuous conduction mode or critical conduction mode.

The controller 202 senses the primary-side current via primary-side sense current $i_{PRIMARY\_SENSE}$, which is, for example, a scaled version of the primary-side current $i_{PRIMARY}$. The controller 202 determines the pulse width $T_1$ of control signal $CS_2$ to maintain the primary-side current $i_{PRIMARY}$ within a predetermined range. In at least one embodiment, the predetermined range is dictated by the component values of transformer 206, diode 214, capacitor 215, and the power demand of load 208. The particular manner of generating control signal $CS_2$ is a matter of design choice. Exemplary systems and methods for generating the switch control signal $CS_2$ are described in, for example, U.S. patent application Ser. No. 13/174,404, entitled "Constant Current Controller With Selectable Gain", assignee Cirrus Logic, Inc., and inventors John L. Melanson, Rahul Singh, and Siddharth Maru, and U.S. patent application Ser. No. 13/486,947, filed on Jun. 1, 2012, entitled "PRIMARY-SIDE CONTROL OF A SWITCHING POWER CONVERTER WITH FEED FORWARD DELAY COMPENSATION", assignee Cirrus Logic, Inc., inventors Zhaohui He, Robert T. Grisamore, and Michael A. Kost, which are both hereby incorporated by reference in their entireties. The power demand of the load 208 can be determined in any number of ways. For example, the power demand of the load 208 can be stored in a memory (not shown) of the controller 202, provided as a dimming level in the optional DIM signal, or set by a reference resistor (not shown).

The amount of energy delivered to the secondary-side of transformer 206 depends in part on knowing the ending time of period T2, which corresponds to the time at which the secondary-side current $i_{SECONDARY}$ decays to zero. Controller 202 utilizes primary-side sensing of the secondary-side voltage to determine the end of period T2. The particular location, components, and method of primary-side sensing is a matter of design choice. In at least one embodiment, the controller 202 performs primary-side sensing from node 217. When using primary-side sensing, the secondary current $i_{SECONDARY}$ is not directly observable by the controller 202. However, the control parameter generator 220 is capable of determining the one or more switching power converter control parameters, such as (i) an estimated time of a minimum value of the secondary-side voltage during the resonant period and (ii) an estimated time at which a current in the secondary-side of the transformer decayed to approximately zero, by determining a resonant period factor of the secondary-side voltage and knowing an approximate timing relationship between the secondary-side voltage and the secondary-side current $i_{SECONDARY}$.

Generating the control signal $CS_2$ to cause the switch 202 to begin conducting at an estimated time of a minimum value of the secondary-side voltage $V_S$ during the resonant period increases the energy efficiency of the power distribution system 200. The switch 202 includes parasitic impedances, such as the parasitic capacitor 222. The energy efficiency is increased, for example, because when the secondary-side voltage $V_S$ is at a minimum value, the parasitic capacitor 222 is discharged. Thus, when control signal $CS_2$ causes the switch 202 to conduct at an estimated time of a minimum value of the secondary-side voltage, the parasitic capacitor 222 does not charge or at least discharge is minimized when the switch 202 is turned ON.

To determine an estimated time of a minimum value of the secondary-side voltage $V_S$ during the resonant period, the controller 202 detects zero crossings of the signal ZCD during a resonant period of the secondary-side voltage $V_S$. As subsequently described in more detail, if switch 212 remains non-conductive after the secondary-side voltage $V_S$ drops to zero during a period of the control signal $CS_2$, the secondary-side voltage $V_S$ will resonate. By detecting at least two zero crossings of the resonating secondary-side voltage $V_S$ and determining the elapsed time between the detected zero crossings, the control parameter generator 220 can determine the resonant period factor. The minimum value of the resonating secondary-side voltage $V_S$ occurs 90° after each zero crossing, and 90° represents ¼ of the resonant period $T_{RES}$. Thus, the minimum value of the resonating secondary-side voltage $V_S$ occurs at the time of the detected zero crossing plus $T_{RES}/4$. The resonant period $T_{RES}$ is generally in the range of 0.667 μsec to 2 μsec. For example, if the time between two adjacent zero crossings of the resonant secondary-side voltage $V_S$ is 0.5 μsec, then the resonant period $T_{RES}$ is (0.5 μsec)·(2)=1.0 μsec and the resonant period factor $T_{RES}/4$=0.25 μsec. Thus, when the control parameter generator 220 detects a zero crossing of the secondary-side voltage $V_S$ at time $t_0$, then the control parameter generator 220 determines that the minimum value of the resonating secondary-side voltage $V_S$ will occur at time $t_0$ plus 0.25 μsec.

When the secondary-side voltage $V_S$ resonates, the secondary-side voltage $V_S$ lags the secondary-side current $i_{SECONDARY}$ by X degrees, where X is a number. The resonant period factor for determining an estimated time at which secondary-side current decayed to approximately zero is represented by $T_{RES}·X/360°$. In at least one embodiment, X is 90°, which equates to a resonant period factor of $T_{RES}/4$. During the resonance of the secondary-side voltage $V_S$ and after the secondary-side current $i_{SECONDARY}$ decays to zero, the secondary-side voltage $V_S$ reaches approximately 0V X degrees after the secondary-side current decays to zero. By detecting a subsequent zero crossing of the secondary-side voltage $V_S$, the control parameter generator 220 determines the resonant period factor $T_{RES}·X/360°$. For example, if the time between two adjacent zero crossings of the resonant secondary-side voltage $V_S$ is 0.5 μsec, then the resonant period $T_{RES}$ is (0.5 μsec)·(2)=1.0 μsec. If X equals 90°, then the resonant period factor $T_{RES}/4$ to determine the estimated time at which secondary-side current decayed to approximately zero=1.0 μsec/4=0.25 μsec. Thus, when the control parameter generator 220 detects a zero crossing of the secondary-side voltage $V_S$ at time $t_0$, then the control parameter generator 220 determines that estimated time at which secondary-side current $i_{SECONDARY}$ decayed to approximately zero occurred at time $t_0$ minus 0.25 μsec. The secondary-side voltage $V_S$ equals the primary-side voltage $V_P/N$, and N is a number representing the turns ratio between the primary-side coil 210 and the secondary-side coil 204. The control signal generator 211 can utilize the estimated time at which secondary-side current $i_{SECONDARY}$ decayed to approximately zero to determine the power delivered to the load 208 since the power delivered to the secondary-side 208 equals approximately the integral of the secondary-side current $i_{SECONDARY}$ times the secondary-side voltage $V_S$.

The frequency and timing of determining the resonant period factor or factors is a matter of design choice. In at least one embodiment, the control signal generator 211 generates the control signal $CS_2$ to extend the time when the switch 212 is nonconductive to allow the control parameter generator 220 to probe the resonating secondary-side voltage $V_S$ to detect at least two zero crossings of a resonating secondary-side voltage $V_S$. In at least one embodiment, the control parameter generator 220 detects the multiple zero crossings to determine the resonant period factors for multiple cycles of the control signal $CS_2$ during a single cycle of an AC version of the input voltage $V_{IN}$. In at least one embodiment, the control parameter generator 220 determines the resonant period factors at least three times during a single cycle of an AC version of the input voltage $V_{IN}$. In at least one embodiment, the control parameter generator 220 probes the secondary-side voltage $V_S$ when the input voltage $V_{IN}$ is sufficient to reverse bias a body diode of the current control switch 212 to more accurately determine the resonant period factors. In at least one embodiment, the controller 202 also generates a control signal $CS_3$ to control another switching power converter as, for example, described in U.S. Pat. No. 7,719,246, entitled "Power Control System Using a Nonlinear Delta-Sigma Modulator with Nonlinear Power Conversion Process Modeling", assigned to Cirrus Logic, Inc., and inventor John L. Melanson, which is hereby incorporated by reference in its entirety. In at least one embodiment, the controller 202 also responds to a DIM signal generated by a dimmer (not shown) to modify the power delivered to the load 208 in accordance with a dimmer level indicated by the DIM signal. Exemplary systems and method of interfacing with a dimmer signal are described in, for example, U.S. patent application Ser. No. 12/570,550, entitled "Phase Control Dimming Compatible Lighting Systems", assigned to Cirrus Logic, Inc., inventors William A. Draper and Robert Grisamore, which is hereby incorporated by reference in its entirety.

Figure 3:
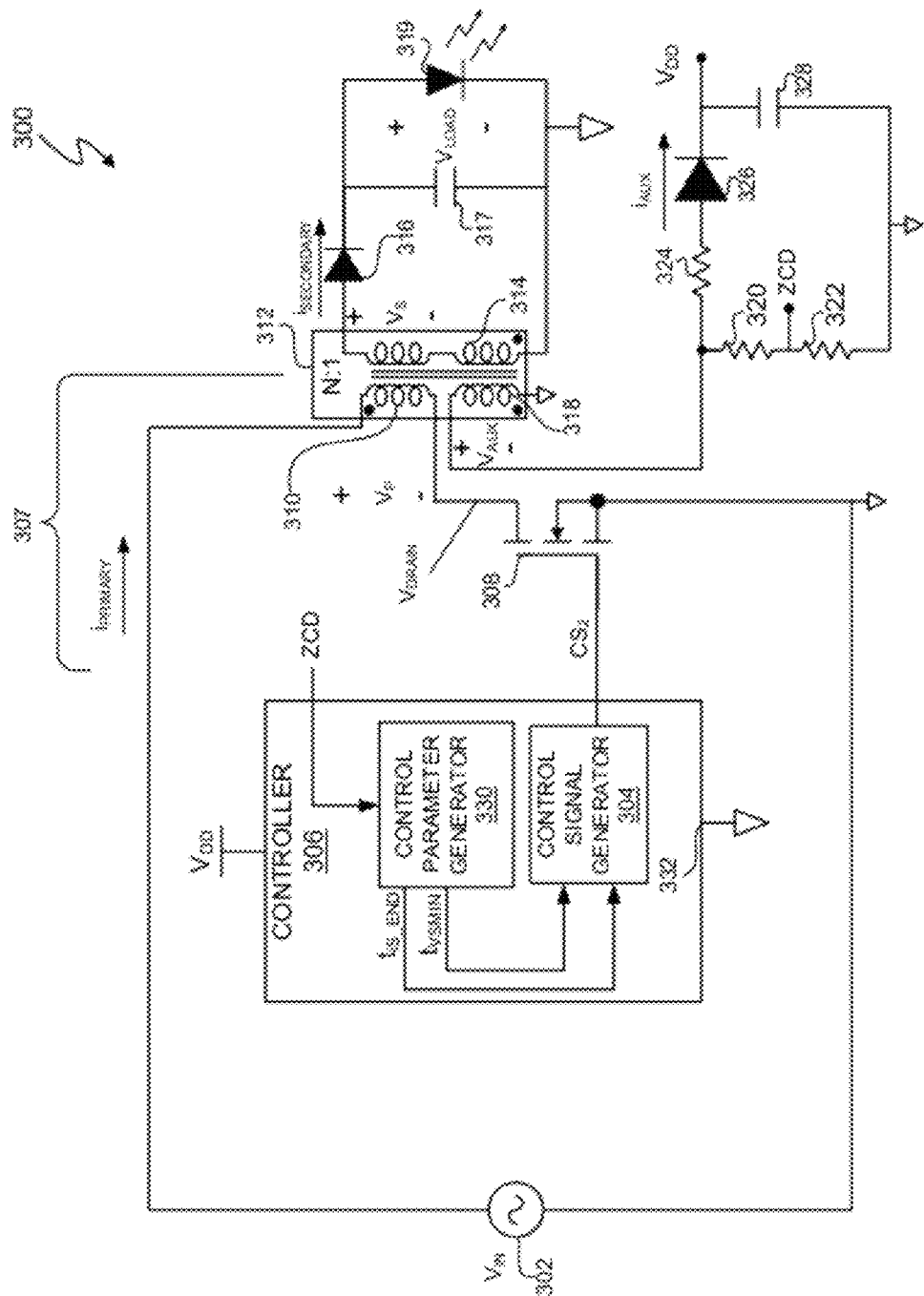
FIG. 3 depicts an embodiment of the power distribution system of FIG. 2.
Figure 4:
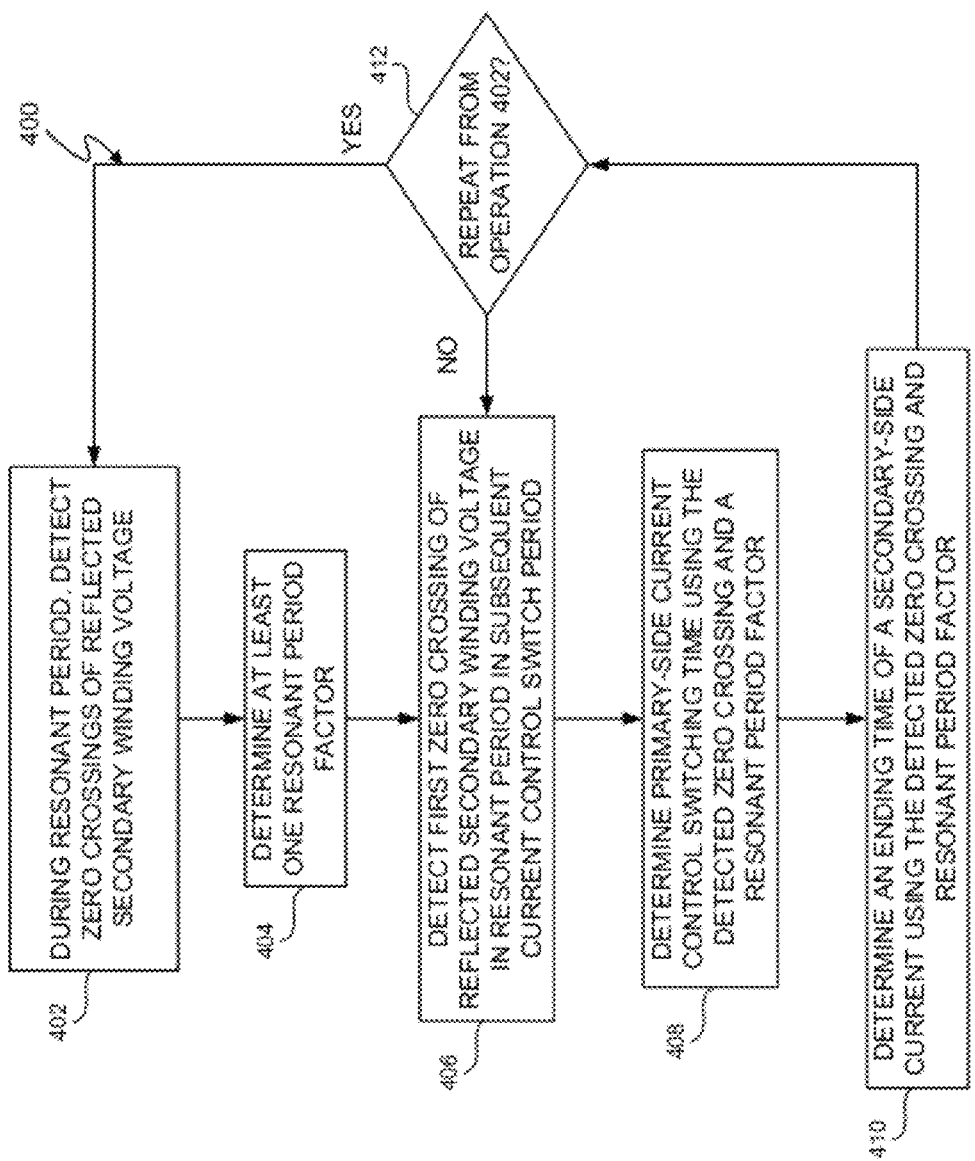
FIG. 4 depicts an exemplary switching power converter control parameter determination process.
Figure 5:
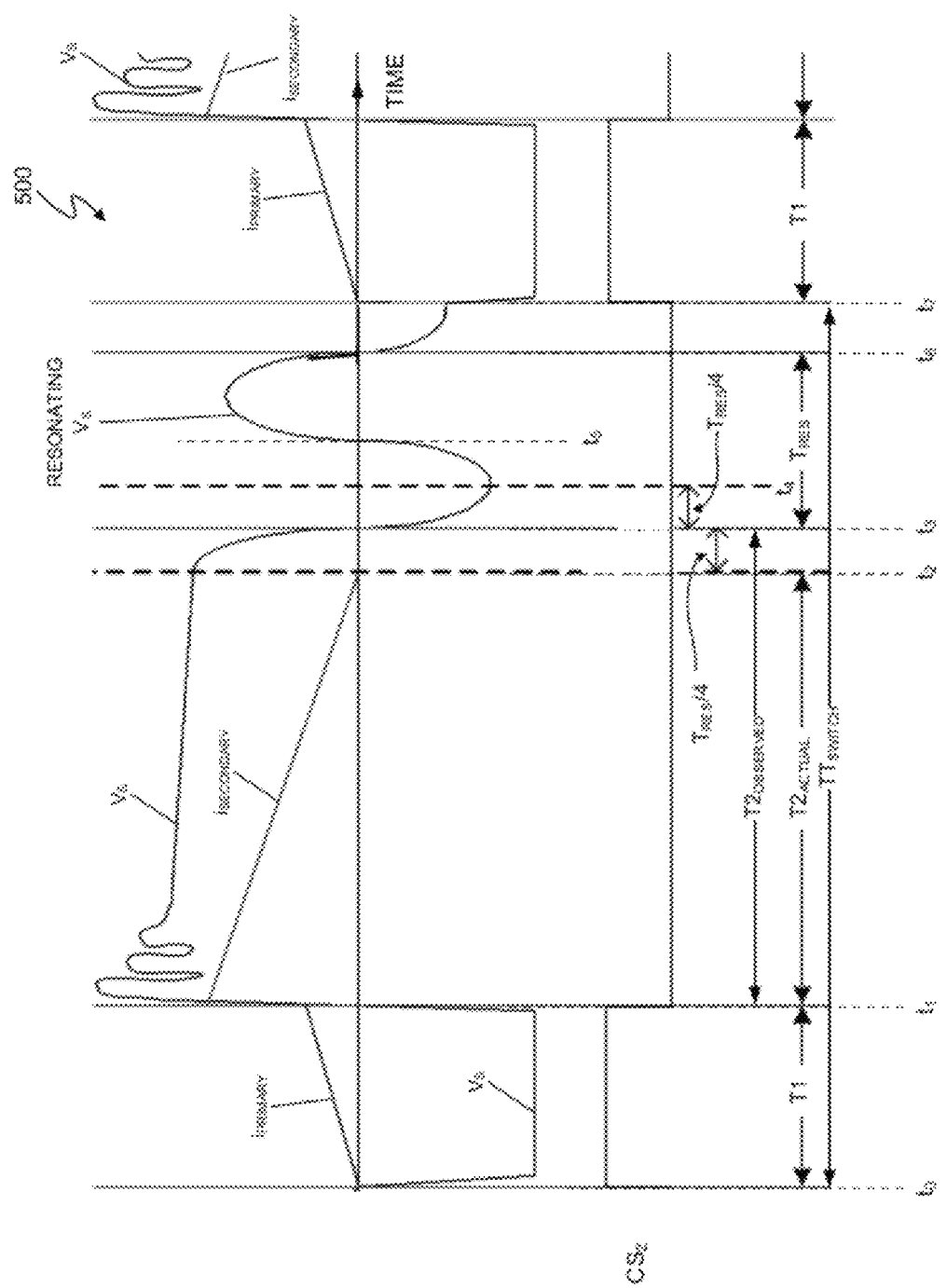
FIGS. 5 and 6 depict exemplary waveforms associated with the system of FIG. 3 and process of FIG. 4.

FIG. 3 depicts a power distribution system 300, which represents one embodiment of the power distribution system 200. FIG. 4 depicts an exemplary switching power converter control parameter determination process 400 to determine (i) an estimated time of a minimum value of the secondary-side voltage $V_S$ during a resonant period of the secondary-side voltage $V_S$ and (ii) an estimated time at which the secondary-side current $i_{SECONDARY}$ decayed to approximately zero. FIG. 5 depicts an exemplary set of waveforms 500 representing waveforms occurring in the power distribution system 300 when determining the exemplary switching power converter control parameters.

Referring to FIGS. 3, 4, and 5, the power distribution system 300 receives an input voltage $V_{IN}$ from an AC voltage source 302, which in one embodiment is identical to the voltage source 102 (FIG. 1). The controller 306 controls a switching power converter 307. At time $t_0$, control signal generator 304 of controller 306 generates a logical one value of control signal $CS_2$, which causes FET 308 to conduct. The control signal generator 304 represents one embodiment of the control signal generator 211. FET 308 conducts during period T1, and the primary-side current $i_{PRIMARY}$ energizes the primary-side coil 310 of transformer 312 during period T1. The secondary voltage $V_S$ across secondary-side coil 314 is negative during period T1, which reverse biases diode 316 and prevents flow of the secondary-side current $i_{SECONDARY}$.

At time $t_1$, control generator 304 turns FET 308 OFF (i.e. non-conductive), the primary-side voltage $V_P$ and secondary-side voltage $V_S$ reverse, and the secondary-side current $i_{SECONDARY}$ quickly rises. At the beginning of period $T2_{OBSERVED}$ and $T2_{ACTUAL}$, the secondary-side voltage $V_S$ experiences brief oscillations followed by a time of an approximately constant value. The secondary-side current $i_{SECONDARY}$ flows through the now forward biased diode 316 and charges capacitor 317 to develop a voltage $V_{LOAD}$ across LEDs 319. The secondary-side current $i_{SECONDARY}$ decays to zero at time $t_2$. Time $t_2$ marks the end of the actual period $T2_{ACTUAL}$. At time $t_2$, which is the end of the actual period $T2_{ACTUAL}$, the secondary-side voltage $V_S$ begins to resonate and reaches a first zero crossing during the cycle of control signal $CS_2$ at time $t_3$. In at least one embodiment, it is difficult to detect the exact time $t_2$, and, thus, difficult to determine the exact end of period $T2_{ACTUAL}$.

Transformer 312 includes an auxiliary coil 318 on the primary-side of transformer 310 that senses a reflected secondary-side voltage $V_S$. The auxiliary voltage $V_{AUX}$ across the auxiliary coil 318 represents the sensed secondary-side voltage $V_S$. Resistors 320 and 322 provide a voltage divider so that the zero crossing detection ZCD represents a scaled version of the auxiliary voltage $V_{AUX}$ and, thus, also represents a sensed version of the secondary-side voltage $V_S$. In addition to sensing the secondary-side voltage $V_S$, the auxiliary voltage $V_{AUX}$ also generates a current $i_{AUX}$ through resistor 324 and diode 326 to generate the controller supply voltage $V_{DD}$ across capacitor 328.

The value of the zero crossing detection signal ZCD tracks the secondary-side voltage $V_S$ and indicates a zero crossing of the secondary-side voltage $V_S$ at time $t_3$. The elapsed time between time $t_1$ and time $t_3$ represents an observed period $T2_{OBSERVED}$. In operation 402 during the resonant period of the secondary-side voltage $V_S$, the control parameter generator 330 senses at least two instances of when the zero crossing detection signal ZCD reaches approximately 0V during a current control switch period $TT_{SWITCH}$. For example, in at least one embodiment, the control parameter generator 330 senses the first zero crossing of the secondary-side voltage $V_S$ at time $t_3$ and the second zero crossing at time $t_5$. In operation 404, the control parameter generator 330 determines at least one resonant period factor. The elapsed time between times $t_5$ and $t_3$ equals ½ of the resonant period $T_{RES}$. In at least one embodiment, the control parameter generator 330 also detects additional zero crossings, such as the zero crossing at time $t_6$ and generates an average value of the resonant period $T_{RES}$ and/or a fraction of the resonant period $T_{RES}$, such as $T_{RES}/4$. The manner of detecting the 0V value of the zero crossing detection signal ZCD is a matter of design choice. In at least one embodiment, the control parameter generator 330 includes a digital microprocessor (not shown) connected to a memory (not shown) storing code that is executable by the processor to determine the control parameters. Other exemplary embodiments are discussed in more detail in FIG. 8.

The minimum value of the secondary-side voltage $V_S$ occurs at the lowest valley of the secondary-side voltage during the resonant period $T_{RES}$. As evident in FIG. 5, the minimum value of the secondary-side voltage $V_S$ occurs at time $t_4$, and time $t_4$ equals the time from the first zero crossing at time $t_3$ plus the resonant period factor $T_{RES}/4$. The estimated time $t_2$ at which the secondary-side current $i_{SECONDARY}$ decayed to approximately zero occurs X degrees prior to the first zero crossing at time $t_4$ during the current control switch period $TT_{SWITCH}$ of the switch control signal $CS_2$ while the secondary-side voltage $V_S$ is resonating. In at least one embodiment, X is 90°, which equates to a resonant period factor of $T_{RES}/4$. Thus, the secondary-side current $i_{SECONDARY}$ decayed to approximately zero at time $t_3$ minus the resonant factor $T_{RES}/4$. Since X equals 90°, operation 404 determines one resonant period factor $T_{RES}/4$ to determine both control parameters: (i) the estimated time of the minimum value of the secondary-side voltage $V_S$ during the resonant period $T_{RES}$, which equates to time $t_4$ and (ii) an estimated time at which the secondary-side current $i_{SECONDARY}$ decayed to approximately zero, which equates to time $t_2$. If X is not approximately 90°, in at least one embodiment, the control parameter generator 330 determines a separate resonant period factor for determining time $t_4$ and time $t_2$. At time $t_7$, the current control switch period $TT_{SWITCH}$ ends, and the control signal generator 304 initiates a new pulse and, thus, a new cycle of the control signal $CS_2$.

Figure 6:
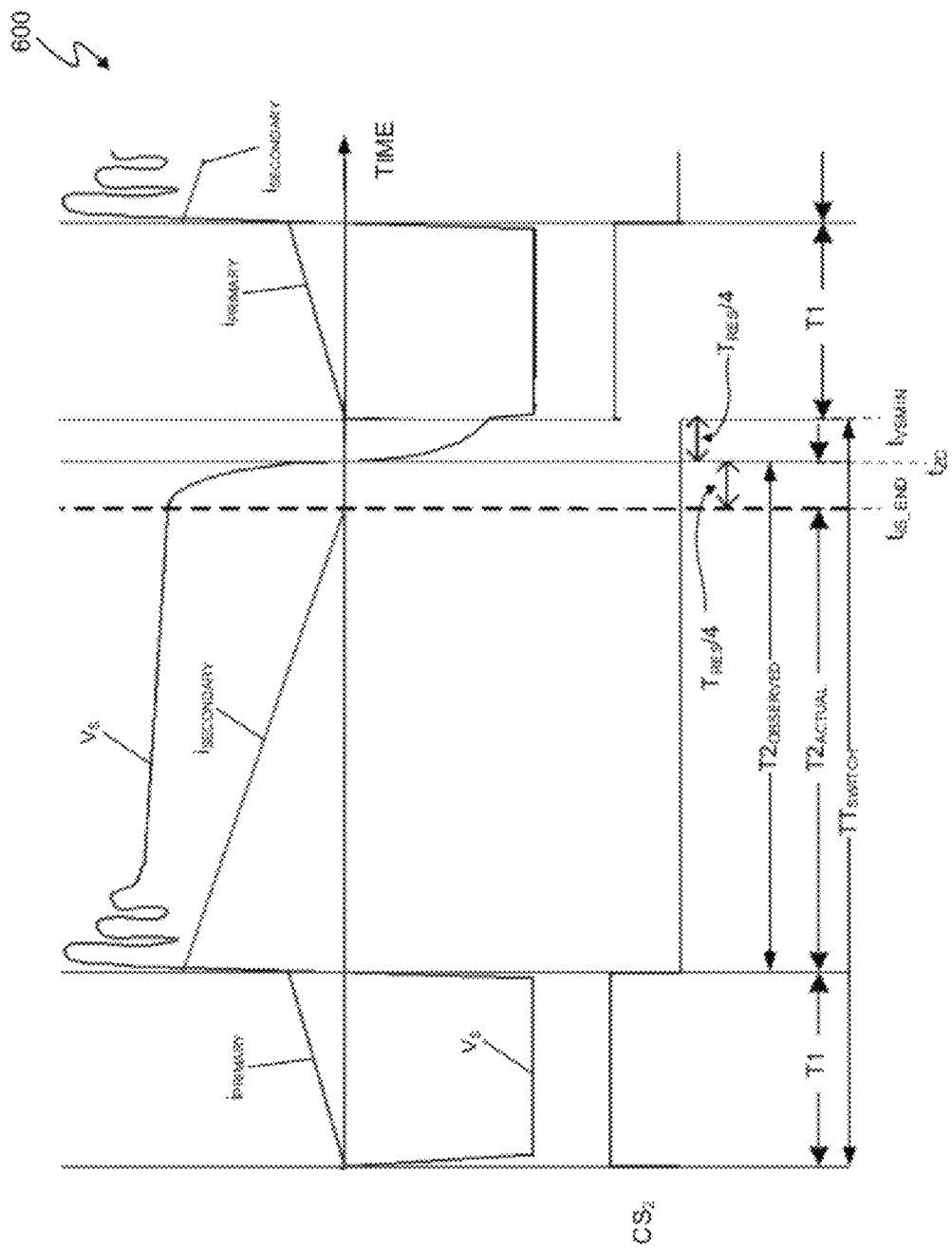

FIG. 6 depicts an exemplary set of waveforms 600 representing waveforms occurring in the power distribution system 300 during normal operation. Referring to FIGS. 3, 4, and 6, during normal operation, based on the results of operations 402 and 404, the control parameter generator 330 performs operations 406, 408, and 410 to determine the control parameters for use by the control signal generator 304 to generate the switch control signal $CS_2$. In operation 406, during a subsequent current control switch period $TT_{SWITCH}$ after the period depicted in FIG. 5, the control parameter generator 330 detects the first zero crossing at time $t_{ZC}$. Operation 408 determines the primary-side current control switching time $t_{VSMIN}$ by adding the resonant period factor $T_{RES}/4$ determined in operation 404 to the zero crossing time $t_{ZC}$, i.e. $t_{VSMIN} = t_{ZC} + T_{RES}/4$. The control parameter generator 330 provides the resulting switching time $t_{VSMIN}$ to the control signal generator 304. At time $t_{VSMIN}$, the control signal generator 304 generates a logical one value for control signal $CS_2$, which causes FET 308 to conduct. As previously discussed, causing the FET 308 to conduct at the minimum value of the secondary-side voltage $V_S$ during the resonant period $T_{RES}$ increases the energy efficiency of the power distribution system 300.

Operation 410 determines the time $t_{iS\_END}$, which is the estimated time at which the secondary current $i_{SECONDARY}$ decayed to approximately zero at the end of the present period $T2_{ACTUAL}$. Operation 410 determines the time $t_{iS\_END}$ by subtracting the resonant period factor $T_{RES}/4$ from the zero crossing time $t_{ZC}$, i.e. $t_{iS\_END} = t_{ZC} - T_{RES}/4$. The control parameter generator 330 provides the time $t_{iS\_END}$ to the control signal generator 304 to, for example, allow the control signal generator to determine how much current was provided to the secondary-side of the transformer 312 and generate the control signal period T1 in accordance with power demands of the LED 319. Operation 412 determines whether and when to repeat the switching power converter control parameter determination process 400 from operation 402 or operation 406 for the next current control switch period.

Figure 7:
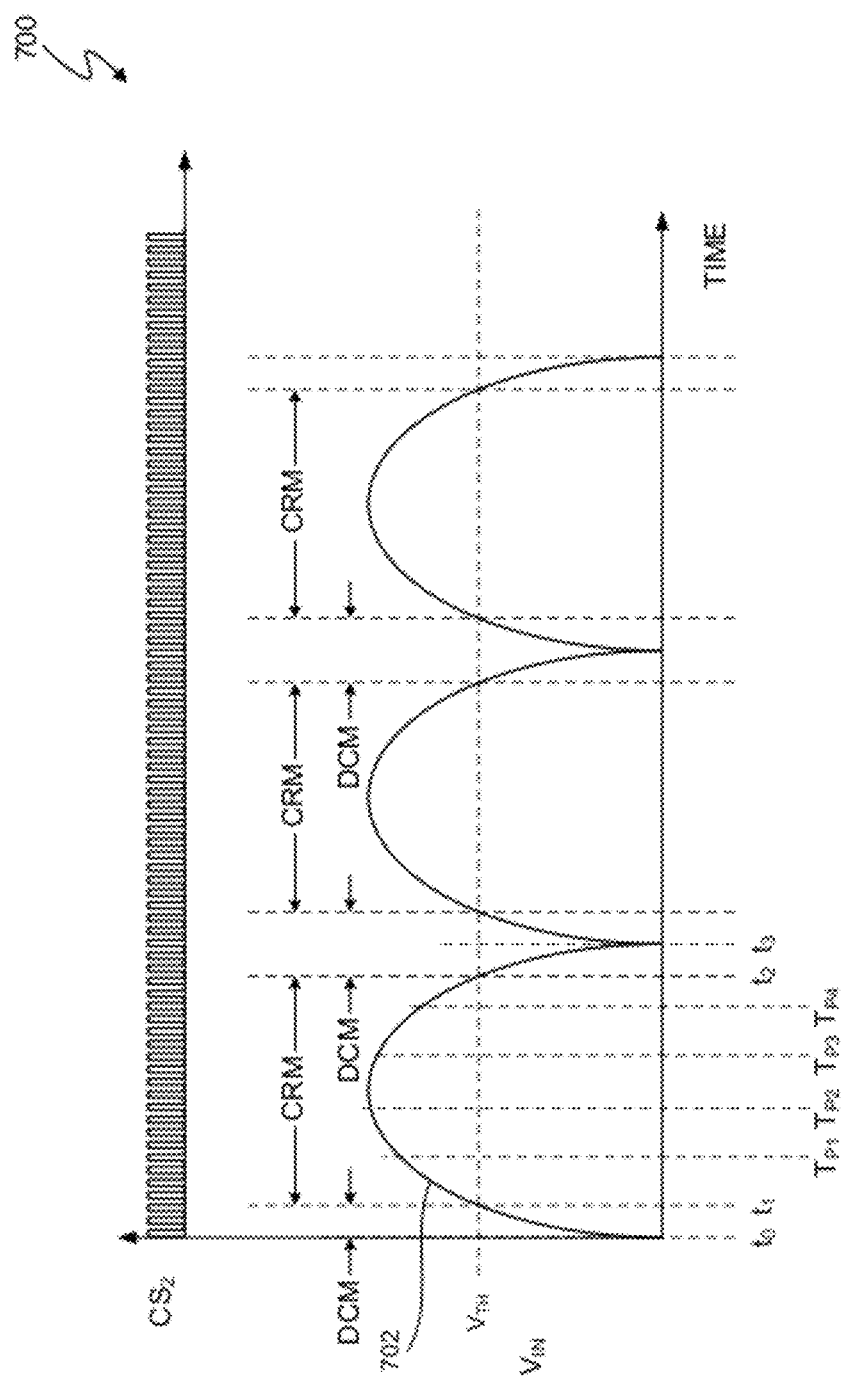
FIG. 7 depicts exemplary probing times of an input voltage to the power system of FIG. 3.

Determining how often to repeat the switching power converter control parameter determination process 400 from operation 402 is a matter of design choice. FIG. 7 depicts exemplary control signal and input voltage signals 700 with exemplary probing times $T_{P1}$, $T_{P2}$, $T_{P3}$, and $T_{P4}$. Referring to FIGS. 3 and 7, this embodiment of the input voltage $V_{IN}$ is a rectified sinusoidal wave. To operate more efficiently, in this embodiment, the controller signal generator 304 (FIG. 3)

operates the switching power converter 307 in discontinuous conduction mode (DCM) when the input voltage $V_{IN}$ is less than a threshold voltage $V_{TH}$ and in critical conduction mode (CRM) when the input voltage $V_{IN}$ is greater than or equal to the threshold voltage $V_{TH}$. The particular threshold voltage $V_{TH}$ is a matter of design choice and corresponds to, for example, the input voltage $V_{IN}$ at 30° and 150°. When the input voltage $V_{IN}$ is greater than the threshold voltage $V_{TH}$ and the switching power converter operates in CRM, the minimum drain voltage $V_{DRAIN}$ of FET 308 when the secondary-side voltage $V_S$ resonates is sufficient to keep a parasitic body diode (not shown) of FET 308 reverse biased. However, when the input voltage $V_{IN}$ is less than the threshold voltage $V_{TH}$ and the switching power converter operates in DCM, the minimum drain voltage $V_{DRAIN}$ may be insufficient to keep the parasitic body diode reversed biased with the secondary-side voltage $V_S$ resonates.

Thus, in at least one embodiment, operation 412 causes the control parameter generator 330 to repeat from operation 402 (corresponding to FIG. 5) during the time when the switching power converter 307 operates in the CRM region. In at least one embodiment, the control parameter generator 330 performs the operations 402 and 404 to determine the resonant period factor at multiple probing times during each cycle of the input voltage $V_{IN}$. Probing times $T_{P1}$, $T_{P2}$, $T_{P3}$, and $T_{P4}$ are exemplary. In at least one embodiment, the control parameter generator 330 utilizes multiple probing times to update the resonant period factor since the resonant period can change over time. In at least one embodiment, the control parameter generator 330 also averages multiple determined resonant period factors to obtain a higher confidence resonant period factor. The particular number of determined resonant period factors obtained during a cycle of the input voltage $V_{IN}$ is a matter of design choice. The particular probing times are also a matter of design choice. In at least one embodiment, the control parameter generator 330 performs operations 402 and 404 at least three times per 50-60 Hz cycle of the input voltage $V_{IN}$. For overall perspective, in at least one embodiment, the control signal $CS_2$ is at least 25 kHz. Thus, in at least one embodiment, most of the time, operation 412 repeats the switching power converter control parameter determination process 400 from operation 406. In at least one embodiment, cycle 702 of the input voltage $V_{IN}$ is representative of subsequent cycles.

Figure 8:
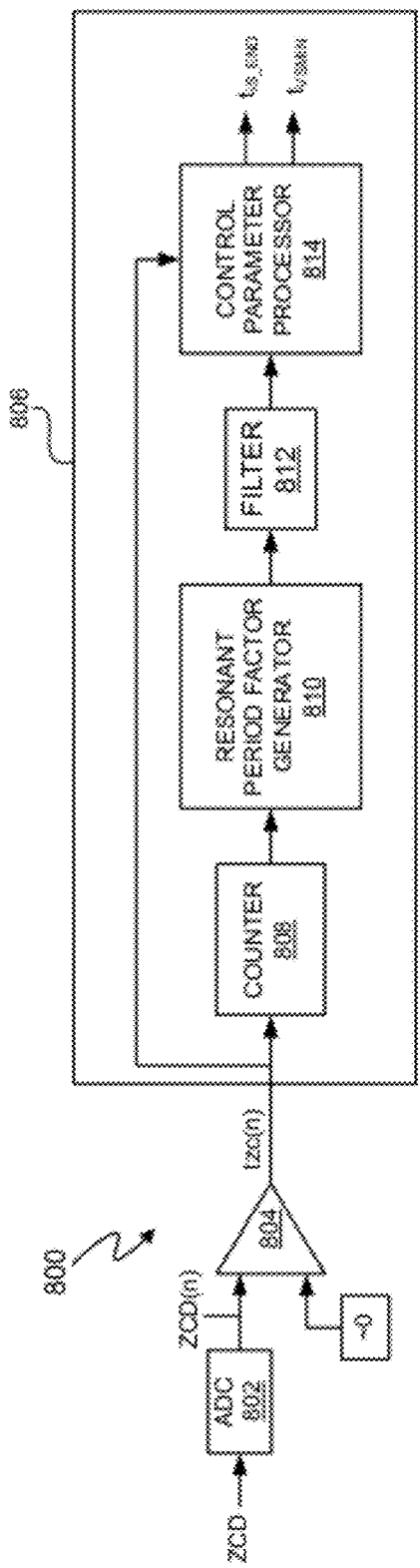
FIGS. 8 and 9 depict exemplary control parameter generators.

FIG. 8 depicts a control parameter generator 800, which represents a digital embodiment of control parameter generator 330. The control parameter generator 800 represents a digital version of the control parameter generator 330. The control parameter generator 800 includes an analog-to-converter (ADC) 802 to receive and convert the zero crossing detection signal ZCD into a digital value ZCD(n). The logical comparator 804 compares ZCD(n) with approximately 0 to determine if the value of ZCD(n) equals approximately 0. "Approximately 0" is used since the voltage divider by resistors 320 and 322 creates a slight offset of ZCD when the reflected secondary-side voltage $V_S$ equals zero. In at least one embodiment, ZCD is modified by the offset, and ADC 802 compares the modified ZCD with 0.

The logical comparator generates the output signal $t_{ZC}(n)$ at the time ZCD(n) that is approximately zero and provides $t_{ZC}(n)$ to control parameter determination stage 806. Counter 808 receives $t_{ZC}(n)$ and determines the time between $t_{ZC}(n)$ and $t_{ZC}(n+1)$, which equals $T_{RES}/2$. The resonant period factor generator 810 determines the resonant period factor from the time between $t_{ZC}(n)$ and $t_{ZC}(n+1)$. Filter 812 averages M number of resonant period factors generated by the resonant period factor 810. M is an integer greater than or equal to two.

The control parameter processor performs operations 406-412 to determine the time $t_{iS\_END}$ at which the secondary current decayed to zero and the time $t_{VSMIN}$ of minimum value of the secondary-side voltage $V_S$ during resonance.

Figure 9:
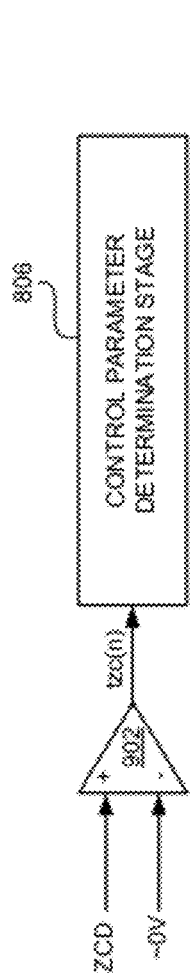

FIG. 9 depicts control parameter generator 900, which represents a mixed analog/digital version of the control parameter generator 330. The control parameter generator 900 includes an analog comparator 902 to compare the zero crossing detection signal ZCD with approximately 0V to account for the offset voltage of the resistors 320 and 322 voltage divider. The comparator 902 generates the zero crossing time $t_{ZC}(n)$ as a logical zero when the zero crossing detection signal ZCD is less than ~0V. The control parameter determination stage 806 then processes the zero crossing times $t_{ZC}(n)$ as previously described in conjunction with FIG. 8.

Thus, a power distribution system includes a controller that determines one or more switching power converter control parameters using a resonant period factor from a reflected secondary-side voltage and an occurrence of an approximate zero voltage crossing of the secondary-side voltage during a resonant period of the secondary-side voltage.

Although embodiments have been described in detail, it should be understood that various changes, substitutions, and alterations can be made hereto without departing from the spirit and scope of the invention as defined by the appended claims.

What is claimed is:

1. A method comprising:
   operating a switching power converter in discontinuous conduction mode when an input voltage to the switching power converter is less than a threshold voltage;
   operating the switching power converter in critical conduction mode when the input voltage is greater than the threshold voltage;
   receiving a primary-side sense signal, wherein the primary-side sense signal is from a portion of a switching power converter that includes a primary-side of a transformer and the sense signal represents a secondary-side voltage across a secondary-side of the transformer;
   when the switching power converter is operating in critical conduction mode:
      determining one or more times between approximately zero crossings of the secondary-side voltage during one or more resonant periods of the secondary-side voltage, wherein each resonant period occurs after the secondary-side voltage decreases to zero and before a current in the primary-side of the transformer increases from approximately zero;
      determining one or more resonant period factors using the one or more times between approximately zero crossings of the secondary-side voltage;
      determining a time value that indicates when an approximate minimum value of the secondary-side voltage occurs during at least one of the resonant periods using (i) the one or more resonant period factors and (ii) an occurrence of an approximate zero voltage crossing of the secondary-side voltage during a resonant period of the secondary-side voltage; and
   generating a switch control signal pulse in accordance with the determined time value, which indicates occurrence of the minimum value of the secondary-side voltage, to control conductivity of a switch that controls current in the primary-side of the transformer of the switching power converter.

2. The method of claim 1 wherein the one or more switching power converter control parameters comprise an estimated time at which a current in the secondary-side of the transformer decayed to approximately zero.

3. The method of claim 2 wherein the one or more resonant period factors comprise a time that equals approximately one-fourth of the resonant period, and determining one or more switching power converter control parameters further comprises:
during a cycle of a switch controlling current in the primary-side of the transformer, subtracting the resonant period factor from a time of a first approximately zero voltage crossing of the resonant period to determine an estimated time at which a current in the secondary-side of the transformer decayed to approximately zero.

4. The method of claim 1 wherein the one or more switching power converter control parameters comprise an estimated time of a minimum value of the secondary-side voltage during the resonant period.

5. The method of claim 4 wherein the one or more resonant period factors comprise a time that equals approximately one-fourth of the resonant period, and determining one or more switching power converter control parameters further comprises:
during a cycle of a switch controlling current in the primary-side of the transformer, adding the resonant period factor to a time of a first approximately zero voltage crossing of the resonant period to determine an estimated time of a minimum value of the secondary-side voltage during the resonant period.

6. The method of claim 4 further comprising:
causing the switch controlling the current in the primary-side of the transformer to conduct one-quarter period after a detected zero voltage crossing of the secondary-side voltage.

7. The method of claim 1 wherein the one or more switching power converter control parameters comprise (i) an estimated time of a minimum value of the secondary-side voltage during the resonant period and (ii) an estimated time at which a current in the secondary-side of the transformer decayed to approximately zero.

8. The method of claim 1 wherein the signal representing the secondary-side voltage across a secondary-side of the transformer is a reflected secondary-side voltage across an auxiliary winding of the transformer coupled to the secondary-side of the transformer.

9. The method of claim 1 wherein:
determining each time between approximately zero crossings of the secondary-side voltage during one or more resonant periods of the secondary-side voltage comprises:
allowing the secondary-side voltage to resonate for at least one-half period between adjacent zero crossings; and
determining the one or more resonant period factors from the one or more times between approximately zero crossings of the secondary-side voltage comprises:
averaging times between multiple adjacent approximately zero crossings of the secondary-side voltage multiple at least one-half resonant periods to determine an average of the resonant period factors.

10. The method of claim 1 further comprising:
determining one or more times between approximately zero crossings of the secondary-side voltage during one or more resonant periods of the secondary-side voltage when an input voltage to the primary-side of the transformer is sufficient to reverse bias a body diode of a switch that controls current in the primary-side of the transformer.

11. The method of claim 1 further comprising:
detecting the approximately zero crossings of the secondary-side voltage.

12. The method of claim 1 further comprising:
generating a control signal to control power provided to a load.

13. The method of claim 12 wherein the load comprises one or more light emitting diodes.

14. An apparatus comprising:
a controller wherein the controller includes an input to receive a primary-side sense signal, wherein the primary-side sense signal is from a portion of a switching power converter that includes a primary-side of a transformer and the sense signal represents a secondary-side voltage across a secondary-side of the transformer, and during operation the controller is configured to:
determine one or more times between approximately zero crossings of the secondary-side voltage during one or more resonant periods of the secondary-side voltage, wherein each resonant period occurs after the secondary-side voltage decreases to zero and before a current in the primary-side of the transformer increases from approximately zero;
determine one or more resonant period factors using the one or more times between approximately zero crossings of the secondary-side voltage; and
determine a time value that indicates when an approximate minimum value of the secondary-side voltage occurs during at least one of the resonant periods using (i) the one or more resonant period factors and (ii) an occurrence of an approximate zero voltage crossing of the secondary-side voltage during a resonant period of the secondary-side voltage; and
generate a switch control signal pulse in accordance with the determined time value, which indicates occurrence of the minimum value of the secondary-side voltage, to control conductivity of a switch that controls current in the primary-side of the transformer of the switching power converter.

15. The apparatus of claim 14 wherein the one or more switching power converter control parameters comprise an estimated time at which a current in the secondary-side of the transformer decayed to approximately zero.

16. The apparatus of claim 15 wherein the one or more resonant period factors comprise a time that equals approximately one-fourth of the resonant period, and to determine the one or more switching power converter control parameters, the controller is further capable to:
during a cycle of a switch controlling current in the primary-side of the transformer, subtract the resonant period factor from a time of a first approximately zero voltage crossing of the resonant period to determine an estimated time at which a current in the secondary-side of the transformer decayed to approximately zero.

17. The apparatus of claim 14 wherein the one or more switching power converter control parameters comprise an estimated time of a minimum value of the secondary-side voltage during the resonant period.

18. The apparatus of claim 14 wherein the one or more resonant period factors comprise a time that equals approximately one-fourth of the resonant period, and to determine the one or more switching power converter control parameters, the controller is further capable to:
during a cycle of a switch controlling current in the primary-side of the transformer, add the resonant period factor to a time of a first approximately zero voltage crossing of the resonant period to determine an estimated time of a minimum value of the secondary-side voltage during the resonant period.

19. The apparatus of claim 18, the controller is further capable to:
cause the switch controlling the current in the primary-side of the transformer to conduct one-quarter period after a detected zero voltage crossing of the secondary-side voltage.

20. The apparatus of claim 14 wherein the one or more switching power converter control parameters comprise (i) an estimated time of a minimum value of the secondary-side voltage during the resonant period and (ii) an estimated time at which a current in the secondary-side of the transformer decayed to approximately zero.

21. The apparatus of claim 14 wherein the signal representing the secondary-side voltage across a secondary-side of the transformer is a reflected secondary-side voltage across an auxiliary winding of the transformer coupled to the secondary-side of the transformer.

22. The apparatus of claim 14 wherein:
to determine each time between approximately zero crossings of the secondary-side voltage during one or more resonant periods of the secondary-side voltage, the controller is further capable to:
allow the secondary-side voltage to resonate for at least one-half period between adjacent zero crossings; and
to determine the one or more resonant period factors from the one or more times between approximately zero crossings of the secondary-side voltage, the controller is further capable to:
average times between multiple adjacent approximately zero crossings of the secondary-side voltage multiple at least one-half resonant periods to determine an average of the resonant period factors.

23. The apparatus of claim 14 wherein the controller is further capable to:
determine one or more times between approximately zero crossings of the secondary-side voltage during one or more resonant periods of the secondary-side voltage when an input voltage to the primary-side of the transformer is sufficient to reverse bias a body diode of a switch that controls current in the primary-side of the transformer.

24. The apparatus of claim 14 wherein the controller is further capable to:
detect the approximately zero crossings of the secondary-side voltage.

25. The apparatus of claim 14 wherein the controller is further capable to:
generate a control signal to control power provided to a load.

26. The apparatus of claim 25 wherein the load comprises one or more light emitting diodes.

27. An apparatus comprising:
a switching power converter, wherein the switching power converter includes a transformer having a primary-side and a secondary-side;
a controller wherein the controller includes an input to receive a primary-side sense signal, wherein the primary-side sense signal is from a portion of a switching power converter that includes a primary-side of a transformer and the sense signal represents a secondary-side voltage across a secondary-side of the transformer, and during operation the controller is configured to:
determine one or more times between approximately zero crossings of the secondary-side voltage during one or more resonant periods of the secondary-side voltage, wherein each resonant period occurs after the secondary-side voltage decreases to zero and before a current in the primary-side of the transformer increases from approximately zero;
determine one or more resonant period factors using the one or more times between approximately zero crossings of the secondary-side voltage; and
determine a time value that indicates when an approximate minimum value of the secondary-side voltage occurs during at least one of the resonant periods using (i) the one or more resonant period factors and (ii) an occurrence of an approximate zero voltage crossing of the secondary-side voltage during a resonant period of the secondary-side voltage;
generate a switch control signal pulse in accordance with the determined time value, which indicates occurrence of the minimum value of the secondary-side voltage, to control conductivity of a switch that controls current in the primary-side of the transformer of the switching power converter; and
a load coupled to the secondary-side of the transformer of the switching power converter.

28. The apparatus of claim 27 wherein the load comprises one or more light emitting diodes.

* * * * *